Oct. 22, 1963
E. W. INGRAM, JR., ETAL
ATTACHMENT FOR FACILITATING THE POURING OF
COOKED FOODS FROM OPEN MESH FRY BASKETS
Filed March 14, 1961
3,107,602
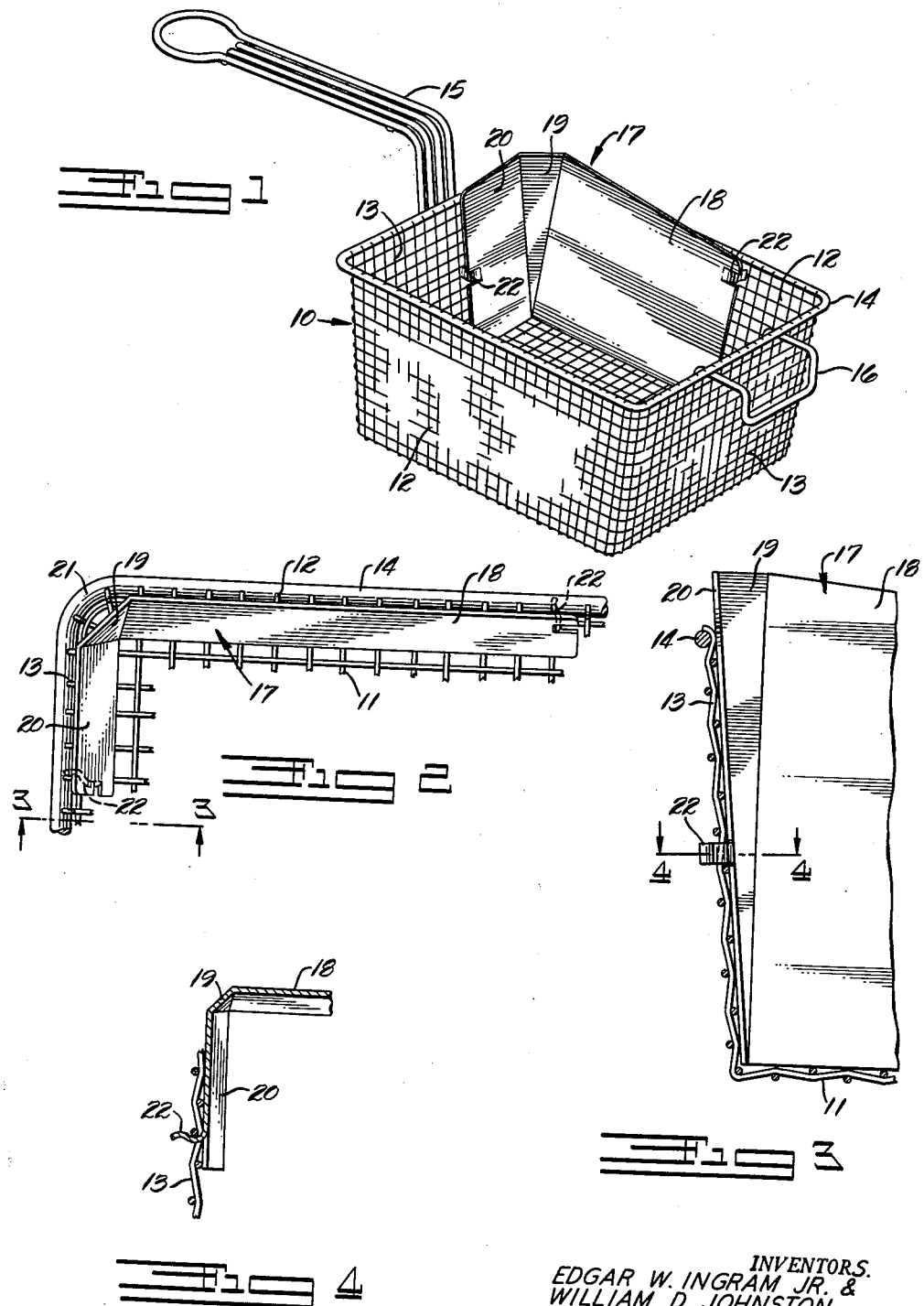
INVENTORS.
EDGAR W. INGRAM JR. &
WILLIAM D. JOHNSTON
BY
MAHONEY, MILLER & RAMBO
BY W.S. Rambo
ATTORNEYS.

United States Patent Office 3,107,602
Patented Oct. 22, 1963

3,107,602
ATTACHMENT FOR FACILITATING THE POURING OF COOKED FOODS FROM OPEN MESH FRY BASKETS
Edgar W. Ingram, Jr., and William D. Johnston, Columbus, Ohio, assignors to White Castle System, Inc., Columbus, Ohio, a corporation of Delaware
Filed Mar. 14, 1961, Ser. No. 95,585
1 Claim. (Cl. 99—407)

The present invention relates generally to cooking utensils, and more particularly to an attachment for open mesh fry baskets for facilitating the discharge or pouring of cooked foods therefrom.

In the cooking of French fried potatoes and other cut foods in deep fat, it is common practice to employ an open mesh wire basket in which the cut potatoes are placed for immersion in the hot cooking oil or fat. The open mesh construction of such baskets permits the individual, relatively small pieces of food contained therein to be thoroughly contacted by the hot oil to insure uniformity of cooking on substantially all surfaces of the food pieces. However, the open mesh construction of such baskets makes it rather difficult to pour or discharge the cooked food pieces therefrom, particularly when the size of the individual pieces of food closely approach the size of the mesh openings of the basket, as is ordinarily the case with French fried potatoes. For example, when preparing French fried potatoes in relatively large batches, such as may be required in a restaurant operation, the individual pieces of cooked potatoes, when it is attempted to pour the same from the basket, tend to lodge in the open mesh of the basket when the latter is tilted toward one side, thus making it difficult to pour the cooked pieces from the basket without first dislodging the pieces which are caught in the open mesh of the basket. Such clogging oftentimes results in wasteful spillage of a quantity of the cooked potatoes, due to a natural tendency on the part of the cook to shake the basket in an attempt to dislodge the clogged pieces during the pouring operation. Also, the tendency of the individual pieces of potatoes to lodge themselves in the open mesh of the basket during pouring, causes certain pieces of the cooked potatoes to be broken, thus making the batch of cooked potatoes unsightly and unappetizing.

It is, therefore, the primary object of the present invention to provide a mechanically simple yet highly efficient attachment for open mesh fry baskets which facilitates the pouring or discharge of cooked foods therefrom by preventing pieces or particles of food from becoming lodged or stuck within the open mesh of the basket when the same is tilted and inverted during a pouring operation.

Another object of this invention is to provide an attachment of this character in the form of an angular plate-like body which is adapted to fit within an inside corner of a generally rectangular or square open mesh fry basket, and which functions to close the open mesh perforations of the basket at the side and end walls thereof adjacent said corner to prevent cooked food pieces from becoming lodged or caught in the open mesh of the basket when the latter is tilted and partly inverted toward the corner of the basket in which the attachment is fitted.

A further object is to provide a pour-facilitating attachment for French fry baskets which takes the form of an imperforate pouring spout arranged to be positioned adjacent an inside corner of the basket and provided with resilient clips adapted to detachably and frictionally engage with the wire mesh of the basket to hold the attachment in operative relation thereto.

These and other objects and advantages of the present invention will become more readily apparent by reference to the following description and accompanying drawing, wherein:

FIG. 1 is a perspective view of an open mesh fry basket showing the present pour-facilitating attachment operatively installed therein;

FIG. 2 is an enlarged, fragmentary, top plan view of the present pour-facilitating attachment showing the same positioned in a corner of an associated fry basket;

FIG. 3 is a detail, vertical sectional view taken along the line 3—3 of FIG. 2; and FIG. 4 is a detail, fragmentary, horizontal sectional view taken along the line 4—4 of FIG. 3.

Referring now to the drawing, the numeral 10 designates generally a rectangular, open mesh fry basket which is formed from interlaced metal wires, and which includes a bottom wall 11, relatively upstanding side walls 12 and end walls 13. The side and end walls of the basket are joined along their upper edges with a rectangular and relatively heavier, rim-forming wire 14. The basket 10 is further provided with the usual gooseneck handle 15 which is welded or otherwise suitably joined with the rearward end wall 13 of the basket. The basket further includes a supporting bail 16 which is connected with the rim wire 14 and which projects outwardly and downwardly from the forward end wall 13 of the basket for engagement with the upper lip or rim of an associated deep fat cooking receptacle, not shown. It will be understood that the basket 10 is of a type commonly used in restaurant operations in the cooking of French fried potatoes and the like, and as such, forms no part of the present invention.

In accordance with the present invention, there is provided a generally upstanding, plate-like body 17 of sheet metal, preferably stainless steel, which is formed to include a flat side panel 18, an intermediate, triangular, corner-forming web or gusset 19 and a flat end panel 20 disposed in perpendicular relation to the plane of the side panel 18. As will be noted particularly by reference to FIGS. 2 and 3 of the drawing, the planes of the side panel 18, the intermediate gusset 19 and the end panel 20 are arranged at a slight angle to the vertical, in order that the side panel 18 and the end panel 20 will lie in substantially flat abutting relation to the slightly inwardly tapering side and end walls 12 and 13, respectively, of the basket when the plate-like body 17 is positioned in a rearward corner of the basket, as indicated in FIGS. 1 and 2. In this position of the plate-like body 17, the corner-forming web or gusset 19 is spaced slightly inwardly from the corresponding corner 21 of the basket and defines a relatively smooth, flat, entrant corner between the panels 18 and 20.

The upstanding outer edges of the panels 18 and 20 are provided with a pair of laterally, outwardly turned and resiliently flexible clips 22 which are preferably struck-out of the sheet metal comprising the side and end panels, and which are arranged to frictionally engage and snap behind certain of the vertical wires which define the side and end walls 12 and 13, respectively, of the basket. The spring clips 22 thus provide a detachable fastening means by which the plate-like body 17 may be securely, but detachably, held in the rearward corner 21 of the basket when the latter is placed in its associated deep-fat receptacle and when later removed and tilted or partially inverted to pour the contents of the basket therefrom.

It will be seen that the plate-like body 17 provides a substantially imperforate pouring spout at one of the rearward corners of the basket, with the side panel 18 closing a substantial area of the open mesh side wall 12 of the basket and the end panel 20 closing a substantial portion of the area of the end wall 13 adjacent the corner 21 of the basket. As will be noted particularly in FIGS. 1 and 3 of the drawing, the height of the plate-like body 17 at its central corner region exceeds the height or depth of the corresponding corner region 21 of the basket, the thereby provide a smooth, uninterrupted surface extending from the bottom of the basket upwardly to a point above the rim thereof. Thus, when it is desired to discharge the contents of the basket, following cooking thereof within an associated deep-fat receptacle, the basket 10, with the plate-like body 17 attached thereto, is lifted by means of the handle 15 and tilted toward the corner 21 to partially invert the basket, thus causing the cooked pieces of food, such as French fried potatoes, to slide toward and over the smooth, flat surfaces provided by the plate-like body 17, and thence outwardly from the basket and into a suitable serving receptacle or plate. Due to the smoth, imperforate surfaces of the plate-like body 17, the pieces or particles of cooked food will not lodge or hange within the open mesh of the basket in the region of the corner 21 thereof, but will flow in a smooth and uniform stream across the body 17 as the basket is tilted and partially inverted toward the corner 21. This eliminates the necessity of shaking the basket during the pouring operation to fully discharge the same, and the attendant spillage and breakage of the cooked food particles.

The present pour-facilitating attachment may be quickly and easily removed from the associated fry basket simply by grasping and pulling the same inwardly toward the center of the basket to thus disengage the spring clips 22 from the associated side and end walls of the basket. Due to the smooth, planar surfaces of the plate-like body 17, the same is very easy to clean and maintain in a sanitary condition.

While a single preferred embodiment of the invention has been illustrated and described in detail, it will be understood that the same is susceptible of modification as to details of construction and design without departing from the spirit of the invention or the scope of the following claim:

Having thus described this invention, what is claimed is:

In combination with a generally rectangular, open top, food-frying basket having a bottom and relatively upstanding side walls of open mesh construction; a pour-facilitating device comprising an angular sheet metal plate having a pair of perpendicularly related, planar side panels connected by an intermediate corner-forming web, said plate being substantially imperforate and being positioned in closing relation to an inner, vertical corner portion only of said basket with the planar side panels of said plate disposed in closely adjacent, substantially parallel relation to the side walls of the basket forming said corner, said plate extending substantially the full depth of said basket and providing in said corner portion a smooth, imperforate surface over which pieces of food cooked in said basket may be poured outwardly therefrom without lodging within the open mesh of the side walls of said basket defining said corner; and resiliently flexible clip means provided on said plate and projecting laterally outwardly through the open mesh side walls of said basket for detachably securing said plate in said corner.

References Cited in the file of this patent
UNITED STATES PATENTS 980,246    Graham ---------------- Jan. 3, 1911
1,553,964   Thomas ---------------- Sept. 15, 1925